United States Patent [19]

Tsuneta et al.

[11] Patent Number: 5,266,105

[45] Date of Patent: Nov. 30, 1993

[54] ANTIFOULING COATING COMPOSITION

[75] Inventors: Kazuyoshi Tsuneta; Tohru Taki; Kenji Kurosawa, all of Nasu; Junya Ohe, Omiya; Yasuzo Uchida, Tokyo, all of Japan

[73] Assignees: Dai Nippon Toryo Co., Ltd., Osaka; Mitsubishi Materials Corporation, Tokyo, both of Japan

[21] Appl. No.: 827,594

[22] Filed: Jan. 29, 1992

[30] Foreign Application Priority Data

| Jan. 30, 1991 | [JP] | Japan | 3-10237 |
| Jan. 30, 1991 | [JP] | Japan | 3-10238 |
| Jan. 30, 1991 | [JP] | Japan | 3-10239 |
| Jan. 30, 1991 | [JP] | Japan | 3-10240 |

[51] Int. Cl.$^5$ ............................................. C09D 5/16
[52] U.S. Cl. ................................. 106/16; 106/218; 106/500; 424/405; 523/122
[58] Field of Search .......... 106/15.05, 16, 218, 106/500; 424/405; 523/122

[56] References Cited

U.S. PATENT DOCUMENTS

| 2,476,372 | 7/1949 | Heiks | 106/16 |
| 2,592,655 | 4/1952 | Carlston et al. | 260/27 |
| 3,332,789 | 7/1967 | Abbott, Jr. | 106/15 |
| 4,221,839 | 9/1980 | de Graaf | 428/413 |

FOREIGN PATENT DOCUMENTS 2385779 10/1978 France .
49-23231 3/1974 Japan .

OTHER PUBLICATIONS

Patent Abstracts of Japan, vol. 10, No. 78(C-335){2135}, Mar. 27, 1986, & JP-A-60-215076, Oct. 28, 1985, T. Shinohara, et al., "Antifouling Paint Composition".

*Primary Examiner*—Mark L. Bell
*Assistant Examiner*—Margaret Einsmann
*Attorney, Agent, or Firm*—Oblon, Spivak, McClelland, Maier & Neustadt

[57] ABSTRACT

The present invention relates to an antifouling coating composition comprising:
(a) a vehicle comprising a hydrophobic resin (A), a slightly soluble resin (B) and a hydrophilic resin (C), and
(b) a copper alloy powder as an antifouling agent comprising from 3 to 25% by weight of nickel and/or manganese, from 0.1 to 1.5% by weight of iron and the rest being copper, and
(c) if necessary, one of zinc oxide, germanium oxide and a flake pigment.

8 Claims, No Drawings

ANTIFOULING COATING COMPOSITION

FIELD OF THE INVENTION

The present invention relates to an underwater antifouling coating composition. More particularly, it relates to an underwater antifouling coating composition containing a copper alloy powder, which is applicable to ships' bottoms, underwater structures (structures used in sea water or fresh water such as harbor facilities, oilwell drilling apparatus or piers) or sea water conduit pipes.

DESCRIPTION OF THE PRIOR ART

It is generally known that if marine-organisms attach to the exterior plate of the bottom of a ship, the propelling energy tends to be lost, and there will be a trouble in the operation of the ship. With respect to underwater structures, it is known that if organisms attach on their surface, the corrosion resistant coating layer will be damaged, and consequently, the durable period of the structures will be shortened. Further, sea water conduit pipes have had a problem that their function is substantially reduced by the deposition of attached organisms.

Thus, attachment of marine-organisms brings about a substantial industrial loss and must be avoided as far as possible. As a measure, it has been in practice to use underwater antifouling coating compositions containing various antifouling agents.

As a conventional antifouling coating composition, there was a composition comprising as a vehicle a water-resistant resin capable of forming a coating film such as a vinyl chloride resin and an antifouling agent such as a copper compound such as cuprous oxide or copper rhodanide, or copper metal, or an organotin compound, added thereto, or an organotin polymer type antifouling coating material composed essentially of a product obtained by chemically bonding tin as an antifouling component to a resin for forming a coating film.

However, the coating film obtained from the former type i.e. the antifouling coating composition comprising a vinyl chloride resin or chlorinated rubber as a vehicle and cuprous oxide, copper rhodanide or copper metal added thereto, was unsatisfactory, because the resin as the vehicle is hydrophobic, and only the antifouling agent present on the outer surface portion of the coating film served effectively, and the continuous dissolution of the antifouling agent was rather short, so that the effective period of the antifouling effect of the coating film was only at a level of one year.

Whereas, the composition containing an organotin compound was most commonly used because of its excellent antifouling properties, but the influence to the environment of the highly toxic organotin compound and accumulation of such toxic compound in organisms have been pointed out as problems. A notice for restricting its use has been issued by the Ministry of Transportation of Japan. Sooner or later, use of the antifouling coating composition containing an organotin compound will be totally prohibited. Therefore, it is desired to develop an antifouling coating composition having a long effective life as a substitute.

From the above viewpoint, various improvements have been attempted.

For example, those containing a copper or copper alloy powder were proposed, such as an antifouling material comprising a water-absorptive elastomer composition and a copper or copper alloy powder (Japanese Unexamined Patent Publication No. 201862/1983) and an underwater antifouling coating composition comprising a vinyl resin or chlorinated rubber as a vehicle and a copper alloy powder as an antifouling agent (Japanese Examined Patent Publication No. 55547/1988). However, in each case, the vehicle was not hydrophilic, and it was not possible to expect antifouling performance for a long period of time.

The present applicants have previously proposed an antifouling coating composition comprising a solvent soluble binder as a vehicle and (i) a copper alloy powder containing nickel and/or manganese (Japanese Unexamined Patent Publication No. 188477/1985), (ii) a copper alloy powder containing nickel and/or manganese and zinc and/or tin (Japanese Patent No. 1438117), (iii) a copper alloy powder containing nickel and/or manganese and aluminum and/or silicon (Japanese Patent No. 1438118), (iv) a copper alloy powder containing nickel and/or manganese, zinc and/or tin and aluminum and/or silicon (Japanese Patent No. 1438119), or (v) a copper alloy powder containing nickel and/or manganese and iron (Japanese Patent No. 1504807).

Further, as examples in which a hydrophilic resin is used as a vehicle, an antifouling coating material using a vehicle which is a combination of a water-insoluble resin and a water-soluble resin, and cuprous oxide or an organotin compound (Japanese Unexamined Patent Publication No. 180565/1983), and an antifouling coating composition using a vehicle which is a combination of a specific water-soluble resin such as methyl vinyl ether or N-vinyl pyrrolidone and a slightly hydrolizable acryl copolymer (Japanese Unexamined Patent Publication No. 31285/1989) have been developed. However, neither one was promising in the antifouling performance for a long period of time or its lasting effects, because with the former, the insoluble resin remained after elution of the water-soluble resin and the subsequent elution of the antifouling agent tended to be poor, and with the latter, the coating film properties were inadequate, and blistering or peeling was likely to occur. Further, particularly in the latter case, there was a problems that the copper alloy tended to precipitate during the storage to form a hard precipitate which was hardly dispersible again.

Furthermore, an antifouling coating composition which is a combination of a hydrolyzable binder and cuprous oxide is also known. However, it is thereby still difficult to have the antifouling performance lasting for a long period of time.

SUMMARY OF THE INVENTION

Under these circumstances, the present inventors have conducted extensive research to develop an antifouling coating composition containing no organotin compound and being capable of forming a coating film which is capable of providing excellent antifouling performance for a long period of time, and as a result have arrived at the present invention.

Namely, it is an object of the present invention to provide an antifouling coating composition which is capable of forming a coating film having excellent antifouling performance and being capable of providing such excellent performance for a long period of time.

It is another object of the present invention to provide an antifouling coating composition which contains no organotin compound and thus does not bring about environmental pollution.

Further, it is an additional object of the present invention to provide an antifouling coating composition free from sedimentation of the copper alloy powder.

Thus, the present invention provides an antifouling coating composition comprising:

(a) a vehicle comprising a hydrophobic resin (A), a slightly soluble resin (B) and a hydrophilic resin (C), and (b) a copper alloy powder as an antifouling agent comprising from 3 to 25% by weight of nickel and/or manganese, from 0.1 to 1.5% by weight of iron and the rest being copper, and (c) if necessary, one of zinc oxide, germanium oxide and a flake pigment.

DESCRIPTION OF THE PREFERRED EMBODIMENT

Now, the present invention will be described in detail with reference to the preferred embodiments.

The hydrophobic resin (A) for the vehicle of the antifouling coating composition of the present invention includes, for example, a vinyl resin (such as a vinyl chloride resin, a vinyl chloride-vinyl isobutyl ether copolymer resin or a vinyl chloride-vinyl acetate copolymer resin), chlorinated rubber, chlorinated polyethylene, chlorinated polypropylene, chlorinated paraffin and an acrylic resin. The slightly soluble resin (B) includes, for example, rosin. The hydrophilic resin (C) includes, for example, polyvinyl alcohol, polyvinyl methyl ether, polyvinyl ethyl ether and methylol-modified melamine resin. These resins may be used alone or in combination as a mixture.

In the present invention, the hydrophobic resin (A), the slightly soluble resin (B) and the hydrophilic resin (C) preferably have solubilities in sea water of 20° C. of (A) less than 0.1% by weight/day, (B) from 0.5 to 2% by weight/day and (C) more than 2% by weight/day, respectively.

The above solubilities in sea water of 20° C. can be determined, for example, by a method wherein on one side of a glass sheet of 25 mm×75 mm, a solution of each resin is coated and subjected to air-drying for 3 days, and then it is dried under vacuum at 40° C. to a constant weight. Then, it is immersed in sea water in a beaker of 100 cc for 10 days. Then, it is withdrawn and dried under vacuum at 40° C., whereupon the reduction of the weight is obtained, and the solubility per day is calculated.

In the coating composition of the present invention, the respective resins are preferably used in a weight ratio of A/B=5/1 to 1/5, and in a weight ratio of (A+B)/C=9/1 to 3/7.

In the present invention, if the hydrophilic resin is not incorporated as the vehicle, no adequate effects will be obtained for preventing deposition of slimes, and the supply of copper ions for performing the antifouling effects will be limited only from the surface layer of the coating film, whereby it is impossible to expect antifouling performance for a long period of time.

The combined use of the hydrophilic resin helps elution of the antifouling agent from the interior of the coating film, whereby the antifouling performance will be provided for a long period of the time. However, the hydrophilic resin itself will dissolve in water. Accordingly, if the hydrophilic resin has eluted and only the hydrophobic resin remains, the coating film will be non-uniform, and the antifouling agent tends to hardly elute. By the combined use of the slightly soluble resin, elution of the resin component can be made uniform, whereby a non-uniform film will not remain and a fresh film always appears. Thus, the continuous elution of the antifouling agent can also be improved.

The copper alloy powder used as an antifouling agent in the antifouling coating composition of the present invention, contains from 3 to 25% by weight of at least one metal selected from nickel and manganese and from 1 to 1.5% by weight of iron, and the rest of the composition is mainly copper.

A copper alloy containing a very small amount of impurities may still be within the scope of the copper alloy of the present invention.

The copper alloy powder of the present invention may be in any shape, and it may be a powder or a granular, fibrous or flake-shape.

In the above copper alloy powder, if the content of at least one metal selected from nickel and manganese is less than 3% by weight, the copper alloy powder tends to be oxidized, whereby the continuous antifouling effects tend to be hardly expected. Besides, at the initial stage during the immersion in sea water, the amount of elution of copper ions tends to be excessive, whereby the copper alloy will be wasted and consequently the continuous antifouling effects of the coating film tend to decrease.

On the other hand, if the amount of nickel and/or manganese exceeds 25% by weight, the content of copper as the antifouling agent naturally decreases, whereby the antifouling effects of the coating layer will decrease.

The iron component is required to be present in an amount of from 0.1 to 1.5% by weight for the uniformity of the structure of the copper alloy and for the uniform solubility of the copper.

The copper alloy powder is preferably in a granular form with an average particle size of at most 50 μm, or in a flake particle form having an average length of from 10 to 200 μm and an average thickness of from 2 to 10 μm, or in a fibrous form with an average diameter of from 2 to 15 μm and an average length of from 10 to 200 μm.

In any case, by adjusting the copper alloy powder in the present invention to the specific composition as mentioned above, it is possible to control elution of copper ions and to ensure the continuous antifouling effects.

In the coating composition of the present invention, the above mentioned copper alloy powder is preferably used in a proportion of from 100 to 950 parts by weight, more preferably from 200 to 900 parts by weight, per 100 parts by weight of the solid content of the vehicle.

In the above composition, if the amount of the copper alloy powder is less than 100 parts by weight, the desired antifouling effects tend to be hardly obtained. On the other hand, if the amount exceeds 950 parts by weight, the strength of the coating film tends to be low, and a defect such as peeling tends to easily occur, such being undesirable.

The zinc oxide to be used in the present invention may be any zinc oxide which is commonly used as a pigment for coating compositions.

In the present invention, by incorporating zinc oxide, it is possible to further suppress the deposition of slimes and to further increase the antifouling effects of the present invention.

Such zinc oxide is used preferably in an amount of from 10 to 200 parts by weight, more preferably from 20 to 150 parts by weight, per 100 parts by weight of the solid content of the vehicle.

If the amount of the zinc oxide is less than 10 parts by weight, the effects of the combined use tend to be hardly obtained. On the other hand, if it exceeds 200 parts by weight, it tends to be difficult to form a flat smooth coating film, and the physical properties of the coating film tend to be poor.

Germanium oxide to be used in the present invention may be the one which is commonly commercially available. Germanium oxide having a particle size of at most about 100 μm is preferred.

In the present invention, by incorporation of germanium oxide, it is possible to further suppress the deposition of slimes, and it is possible to further increase the antifouling effects of the present invention.

Such germanium oxide is used preferably in an amount of from 5 to 200 parts by weight, more preferably from 10 150 parts by weight, per 100 parts by weight of the solid content of the vehicle.

Further, the flake pigment to be used in the present invention may be the one which is commonly commercially available. For example, glass flakes, mica, aluminum flakes or flat extender pigments may be mentioned.

The flat pigment preferably has an aspect ratio of at least 10 and a longer diameter of at most 200 μm.

In the present invention, by incorporating the flat pigment, it is possible to prevent sedimentation of the copper alloy powder in the antifouling coating composition.

The flake pigment is used preferably in an amount of from 20 to 200 parts by weight, more preferably from 20 to 150 parts by weight, per 100 parts by weight of the solid content of the vehicle.

If the amount of the flake pigment used is less than 20 parts by weight, the effects for preventing sedimentation of the copper alloy powder tend to be hardly obtained. On the other hand, if it exceeds 200 parts by weight, the antifouling effects of the coating film tend to be low.

The antifouling coating composition of the present invention is capable of forming a coating film having adequate antifouling properties by itself. However, if necessary, other antifouling agents, such as cuprous oxide, copper rhodanite, manganese ethylenebisdithiocarbamate, zinc dimethyldithiocarbamate, 2-methylthio-4-t-butylamino-6-cyclopropylamino-s-triazine, 2,4,5,6-tetrachloroisophthalotrinitrile, N,N-dimethyldichlorophenylurea, zinc-ethylenebisdithiocarbamate, 4,5-dichloro-2-N-octyl-3(2H)isothiazolone, N-(fuluorodichloromethylthio)phthalimide, N,N-dimethyl-N'-phenyl-(N-fluorodichloromethythio)sulfamide, tetramethylthiuram disulfide, 2,4,6-trichlorophenylmaleimide and 2-pyridinethiol-1-oxide, and a zinc salt, may be incorporated alone or as a mixture of two or more of them.

In such a case, the composition preferably comprises 100 parts by weight of the solid content of the vehicle, from 100 to 800 parts by weight of the copper alloy powder and from 0 to 250 parts by weight of said other antifouling agents.

If the amount of the other antifouling agents exceeds 250 parts by weight, the strength of the coating film tends to decrease, such being undesirable.

To the antifouling coating composition of the present invention, various components which are commonly used in coating materials, such as a coloring pigment; an extender pigment; a plasticizer; an elusion assisting agent for the antifouling agent; a solvent; other various additives (including a foam-preventing agent, a sedimentation-preventing agent or a leveling agent), may be incorporated in addition to the above-mentioned components.

The antifouling coating composition of the present invention can be prepared as a one pack type coating material by mixing and dispersing the vehicle, the copper alloy powder and other components all at once or sequentially in divided portions by a conventional apparatus for the preparation of a coating material (such as a ball mill or a disperser).

Otherwise, the components of the coating composition may be divided into two pack-type portions so that the two portions may be mixed and dispersed immediately before use.

The antifouling coating composition of the present invention thus prepared, may be used as it is or after the viscosity is adjusted with a solvent. Namely, it is applied in a dried film thickness of from about 30 to 300 μm to ships or ocean structures usually by airless spray coating or in some cases by roller coating, brush coating or twin-head spraygun coating.

The coating film formed by such an antifouling coating composition of the present invention is excellent in the antifouling performance and yet capable of maintaining such antifouling performance for a long period of time.

Now, the present invention will be described in further detail with reference to Examples and Comparative Examples. However, it should be understood that the present invention is by no means restricted to such specific Examples. In the following Examples, "parts" and "%" mean "parts by weight" and "% by weight", respectively.

The following resins were used in the Examples and Comparative Examples.

Vinyl resin: Laroflex MP45, tradename, manufactured by BASF

Chlorinated rubber: Adeka Chlorinated Rubber CR-5, tradename, manufactured by Asahi Denka Kogyo K.K.

Chlorinated paraffin: Adekasizer E-480, tradename, manufactured by ADEKA ARGAS K.K.

Polyvinyl alcohol: Kurarepoval PVA 117, tradename, manufactured by Kurashiki Rayon K.K.

Polyvinyl methyl ether: Lutonal M40, tradename, manufactured by BASF

Methylol-modified melamine resin: S-695 Watersol, tradename, manufactured by JAPAN REICHHOLD CHEMICALS. INC.

EXAMPLES 1 TO 8

Antifouling coating compositions were prepared to have the blend compositions as identified in Table 1.

TABLE 1

| | Blend compositions of Examples | | | | | | | |
|---|---|---|---|---|---|---|---|---|
| | 1 | 2 | 3 | 4 | 5 | 6 | 7 | 8 |
| Vinyl resin | 8 parts | parts | 4 parts | 5 parts | 10 parts | 7 parts | parts | 4 parts |

TABLE 1-continued

| | Blend compositions of Examples | | | | | | | |
|---|---|---|---|---|---|---|---|---|
| | 1 | 2 | 3 | 4 | 5 | 6 | 7 | 8 |
| Chlorinated rubber | | 8 | | | | | 10 | |
| Chlorinated paraffin | | | 2 | 3 | 2 | | 2 | |
| Rosin | 7 | 2 | 8 | 10 | 5 | 3 | 10 | 2 |
| Polyvinyl alcohol | 5 | | 2 | | 5 | | 8 | |
| Polyvinyl methyl ether | | 8 | | 3 | | | | 3 |
| Methyl-modified melamine resin | | | | | | 10 | | |
| Talc | | | 5 | | | | | |
| Iron oxide red | | | 5 | | | | | |
| Copper alloy powder | 60 | 50 | 40 | 50 | 60 | 50 | 50 | 70 |
| Cuprous oxide | | | | | | 10 | | |
| Zinc dimethyldithio-carbamate | | | | 4 | | | | |
| Xylene | 20 | 32 | 30 | 29 | 18 | 20 | 20 | 21 |
| Copper alloy composition | | | | | | | | |
| Copper | 89% | 88.5% | 79.5% | 89% | 84% | 94% | 79% | 89% |
| Nickel | 0 | 5 | 15 | 10 | 5 | 0 | 20 | 8 |
| Manganese | 10 | 5 | 5 | 0 | 10 | 5 | 0 | 2 |
| Iron | 1.0 | 1.5 | 0.5 | 1.0 | 1.0 | 1.0 | 1.0 | 1.0 |

Each coating composition was prepared by first kneading all the components except for the copper alloy powder by a sand mill to a particle size of 60 μm as measured by particle size method A and then mixing and dispersing the copper alloy powder by a stirrer.

The coating composition thus obtained was coated by an air spray to a dry film thickness of about 100 μm, and the specimen thereby obtained was subjected to a comparative test. The results are shown in Table 2.

Evaluation Method for Antifouling Performance

The antifouling coating composition of each Example was coated on a vinyl chloride resin sheet (300×100×2 mm) by an air spray so that the dried film thickness would be 100 μm and then dried at room temperature for 4 days. Thereafter, the coated plate was immersed in the sea near Toba city, Mie-ken, Japan at from 0 to 30 cm below the sea surface, whereupon the deposition of organisms was observed as the time passed and evaluated in accordance with the following evaluation standards.

Slime 4: No deposition observed
Slime 3: Slight deposition observed
Slime 2: Fair deposition observed
Slime 1: Thick deposition observed
Shells, algae: deposited area (%)

TABLE 2

| | Results of Comparative Tests (Antifouling performance) | | | | | | | | | | | |
|---|---|---|---|---|---|---|---|---|---|---|---|---|
| | 6 months | | 9 months | | 12 months | | 18 months | | 24 months | | 30 months | |
| Examples | Slime | Shells, algae | Slime | Shells, algae | Slime | Shells, algae | Slime | Shells, algae | Slime | Shells, algae | Slime | Shells, algae |
| 1 | 4 | 0 | 3 | 0 | 3 | 0 | 2 | 0 | 2 | 0 | 2 | 0 |
| 2 | 4 | 0 | 3 | 0 | 3 | 0 | 2 | 0 | 2 | 0 | 2 | 0 |
| 3 | 3 | 0 | 3 | 0 | 3 | 0 | 2 | 0 | 2 | 0 | 2 | 2 |
| 4 | 4 | 0 | 3 | 0 | 3 | 0 | 2 | 0 | 2 | 0 | 2 | 0 |
| 5 | 4 | 0 | 3 | 0 | 3 | 0 | 2 | 0 | 2 | 0 | 2 | 0 |
| 6 | 4 | 0 | 3 | 0 | 3 | 0 | 2 | 0 | 2 | 0 | 2 | 0 |
| 7 | 3 | 0 | 3 | 0 | 3 | 0 | 2 | 0 | 2 | 0 | 2 | 2 |
| 8 | 4 | 0 | 3 | 0 | 3 | 0 | 2 | 0 | 2 | 0 | 2 | 0 |

EXAMPLES 9 TO 15

Coating compositions of the present invention were prepared in the same manner as the preceding Examples in accordance with the blend compositions as identified in Table 3. Then, coating was conducted in the same manner as above, and a comparative test was conducted. The results are shown in Table 4.

TABLE 3

| | Blend compositions of Examples | | | | | | |
|---|---|---|---|---|---|---|---|
| | 9 | 10 | 11 | 12 | 13 | 14 | 15 |
| Vinyl resin | 8 parts | 8 parts | 3 parts | 5 parts | 5 parts | parts | 10 parts |
| Chlorinated rubber | | | | 5 | | | |
| Chlorinated paraffin | | | | | 2 | 3 | |
| Rosin | 7 | 7 | 7 | 10 | 10 | 10 | 5 |
| Polyvinyl alcohol | 5 | 5 | | | | 5 | 5 |
| Polyvinyl methyl ether | | | 10 | 5 | | | |
| Methyl-modified melamine resin | | | | | 3 | | |
| Zinc oxide | 10 | 20 | 10 | 10 | 10 | 10 | 8 |
| Talc | | | | | | 5 | |
| Iron oxide red | | | | | | 2 | |
| Copper alloy powder | 50 | 100 | 70 | 50 | 50 | 70 | 50 |
| Zinc dimethyldithio-carbamate | | | | | | | 2 |

TABLE 3-continued

| | Blend compositions of Examples | | | | | | |
|---|---|---|---|---|---|---|---|
| | 9 | 10 | 11 | 12 | 13 | 14 | 15 |
| Xylene | 20 | 20 | 20 | 20 | 20 | 20 | 20 |
| Copper alloy composition | | | | | | | |
| Copper | 89% | 88.5% | 79.5% | 89% | 84% | 94% | 79% |
| Nickel | 0 | 5 | 15 | 10 | 5 | 0 | 20 |
| Manganese | 10 | 5 | 5 | 0 | 10 | 5 | 0 |
| Iron | 1.0 | 1.5 | 0.5 | 1.0 | 1.0 | 1.0 | 1.0 |

TABLE 4

| | Results of Comparative Tests (Antifouling performance) | | | | | | | | | | | |
|---|---|---|---|---|---|---|---|---|---|---|---|---|
| | 6 months | | 9 months | | 12 months | | 18 months | | 24 months | | 30 months | |
| Examples | Slime | Shells, algae | Slime | Shells, algae | Slime | Shells, algae | Slime | Shells, algae | Slime | Shells, algae | Slime | Shells, algae |
| 9 | 4 | 0 | 4 | 0 | 4 | 0 | 3 | 0 | 3 | 0 | 2 | 0 |
| 10 | 4 | 0 | 4 | 0 | 4 | 0 | 3 | 0 | 3 | 0 | 2 | 0 |
| 11 | 4 | 0 | 4 | 0 | 4 | 0 | 4 | 0 | 3 | 0 | 3 | 0 |
| 12 | 4 | 0 | 4 | 0 | 4 | 0 | 4 | 0 | 3 | 0 | 3 | 0 |
| 13 | 4 | 0 | 4 | 0 | 4 | 0 | 4 | 0 | 3 | 0 | 3 | 0 |
| 14 | 4 | 0 | 4 | 0 | 4 | 0 | 4 | 0 | 3 | 0 | 3 | 0 |
| 15 | 3 | 0 | 4 | 0 | 4 | 0 | 3 | 0 | 3 | 0 | 2 | 2 |

(The antifouling performance was evaluated in the same manner as in the preceding Examples.)

EXAMPLES 16 TO 21

Coating compositions of the present invention were prepared in the same manner as the preceding Examples in accordance with the blend compositions as identified in Table 5. Then, coating was conducted in the same manner as above, and a comparative test was conducted. The results are shown in Table 6.

EXAMPLES 22 to 27

Coating compositions of the present invention were prepared in the same manner as in the preceding Examples in accordance with the blend compositions as identified in Table 7. Then, coating was conducted in the same manner as above, and a comparative test was conducted. The results are shown in Table 8.

TABLE 5

| | Blend compositions of Examples | | | | | |
|---|---|---|---|---|---|---|
| | 16 | 17 | 18 | 19 | 20 | 21 |
| Vinyl resin | 5 parts | 10 parts | parts | 10 parts | 5 parts | 10 parts |
| Chlorinated rubber | | | 5 | | | |
| Rosin | 10 | 5 | 10 | 7 | 10 | 5 |
| Polyvinyl alcohol | 5 | | 5 | 3 | | 5 |
| Polyvinyl methyl ether | | 5 | | | | |
| Methyl-modified melamine resin | | | | | 5 | |
| Germanium oxide powder | 20 | 2 | 5 | 10 | 10 | 20 |
| Iron oxide red | | | | | 5 | |
| Copper alloy powder | 50 | 100 | 70 | 60 | 55 | 50 |
| Zinc dimethyldithio-carbamate | | | | | | 5 |
| Xylene | 20 | 20 | 20 | 20 | 20 | 20 |
| Copper alloy composition | | | | | | |
| Copper | 89% | 88.5% | 79.5% | 84% | 94% | 79% |
| Nickel | 0 | 5 | 15 | 5 | 0 | 20 |
| Manganese | 10 | 5 | 5 | 10 | 5 | 0 |
| Iron | 1.0 | 1.5 | 0.5 | 1.0 | 1.0 | 1.0 |

TABLE 6

| | Results of Comparative Tests (Antifouling performance) | | | | | | | | | | | |
|---|---|---|---|---|---|---|---|---|---|---|---|---|
| | 6 months | | 9 months | | 12 months | | 18 months | | 24 months | | 30 months | |
| Examples | Slime | Shells, algae | Slime | Shells, algae | Slime | Shells, algae | Slime | Shells, algae | Slime | Shells, algae | Slime | Shells, algae |
| 16 | 4 | 0 | 4 | 0 | 4 | 0 | 3 | 0 | 2 | 0 | 3 | 0 |
| 17 | 4 | 0 | 4 | 0 | 4 | 0 | 4 | 0 | 3 | 0 | 3 | 0 |
| 18 | 4 | 0 | 4 | 0 | 4 | 0 | 3 | 0 | 3 | 0 | 3 | 0 |
| 19 | 4 | 0 | 4 | 0 | 4 | 0 | 3 | 0 | 3 | 0 | 3 | 0 |
| 20 | 4 | 0 | 4 | 0 | 4 | 0 | 4 | 0 | 3 | 0 | 3 | 0 |
| 21 | 4 | 0 | 4 | 0 | 4 | 0 | 4 | 0 | 3 | 0 | 3 | 2 |

(The antifouling performance was evaluated in the same manner as in the preceding Examples.)

TABLE 7

| | Blend compositions of Examples | | | | | |
|---|---|---|---|---|---|---|
| | 22 | 23 | 24 | 25 | 26 | 27 |
| Vinyl resin | 5 parts | 5 parts | parts | 10 parts | 5 parts | 10 parts |
| Chlorinated rubber | | | 10 | | | |
| Rosin | 10 | 10 | 5 | 7 | 10 | 5 |
| Polyvinyl alcohol | 5 | | 5 | 3 | | 5 |
| Polyvinyl methyl ether | | 5 | | | | |
| Methyl-modified melamine resin | | | | | 5 | |
| Glass flakes *1 | 15 | 5 | 0 | 10 | 5 | |
| Mica *2 | | | 5 | | | 5 |
| Copper alloy powder | 50 | 100 | 70 | 60 | 55 | 50 |
| Xylene | 20 | 20 | 20 | 20 | 20 | 20 |
| Copper alloy composition | | | | | | |
| Copper | 89% | 88.5% | 79.5% | 84% | 94% | 79% |
| Nickel | 0 | 5 | 15 | 5 | 0 | 20 |
| Manganese | 10 | 5 | 5 | 10 | 5 | 0 |
| Iron | 1.0 | 1.5 | 0.5 | 1.0 | 1.0 | 1.0 |

*1: Alkali containing glass, manufactured by Nippon Glass Seni K.K., thickness: about 3 μm, average particle size: about 100 μm
*2: Flaky mica, thickness: about 3 μm, average particle size: about 60 μm

TABLE 8

| | Results of Comparative Tests (Antifouling performance) | | | | | | | | | | | |
|---|---|---|---|---|---|---|---|---|---|---|---|---|
| | 6 months | | 9 months | | 12 months | | 18 months | | 24 months | | 30 months | |
| Examples | Slime | Shells, algae | Slime | Shells, algae | Slime | Shells, algae | Slime | Shells, algae | Slime | Shells, algae | Slime | Shells, algae |
| 22 | 4 | 0 | 3 | 0 | 3 | 0 | 2 | 0 | 2 | 0 | 2 | 0 |
| 23 | 4 | 0 | 3 | 0 | 3 | 0 | 2 | 0 | 2 | 0 | 2 | 0 |
| 24 | 4 | 0 | 3 | 0 | 3 | 0 | 2 | 0 | 2 | 0 | 2 | 0 |
| 25 | 4 | 0 | 3 | 0 | 3 | 0 | 2 | 0 | 2 | 0 | 2 | 0 |
| 26 | 4 | 0 | 3 | 0 | 3 | 0 | 2 | 0 | 2 | 0 | 2 | 0 |
| 27 | 4 | 0 | 3 | 0 | 3 | 0 | 2 | 0 | 2 | 0 | 2 | 0 |

(The antifouling performance was evaluated in the same manner as in the preceding Examples.)

Further, the sedimentation stability of the copper alloy powder in the composition of each of these Examples was examined. The results are shown in Table 9.

TABLE 9

| | Results of comparative tests (sedimentation stability) | | | | | |
|---|---|---|---|---|---|---|
| | 1 month | | 3 months | | 6 months | |
| | Depth of liquid | Re-dispersibility | Depth of liquid | Re-dispersibility | Depth of liquid | Re-dispersibility |
| Example 22 | 0.5 | ○ | 1 | ○ | 1 | ○ |
| Example 23 | 1 | ○ | 1.5 | ○ | 1.7 | ○ |
| Example 24 | 1 | ○ | 1.5 | ○ | 1.6 | ○ |
| Exmaple 25 | 0.5 | ○ | 1 | ○ | 1.2 | ○ |
| Example 26 | 1 | ○ | 1 | ○ | 1.2 | ○ |
| Example 27 | 1 | ○ | 1 | ○ | 1.2 | ○ |

Depth of liquid: The depth (cm) of a supernatant when the composition was put in a glass bottle having a capacity of 200 ml and stored at room temperature.
Re-dispersibility: The re-dispersibility under manual stirring by Spatula
○: The precipitate was soft and readily re-dispersed, and the required time was within one minute.
Δ: The precipitate was slightly hard, and it took about two minutes for re-dispersion.
x: The precipitate was hard, and it took five minutes or more for re-dispersion.

COMPARATIVE EXAMPLES 1 TO 12

Coating compositions of Comparative Examples were prepared in the same manner as in the preceding Examples in accordance with the blending compositions as identified in Table 10. Then, coating was conducted in the same manner as above, and a comparative test was conducted. The results are shown in Table 11.

TABLE 10

| | Blend compositions of Comparative Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Vinyl resin | 20 parts | parts | parts | 5 parts | parts | 20 parts | parts | 15 parts | 20 parts | 15 parts | 15 parts | 15 parts |
| Chlorinated rubber | | 8 | 8 | | 8 | | 8 | | | | | |
| Rosin | | 2 | 2 | | 2 | 15 | 2 | | | 5 | 5 | 5 |
| Polyvinyl alcohol | | | | 15 | | | 5 | 5 | | | | |
| Polyvinyl methyl ether | | 8 | 8 | | 8 | | 8 | | | | | |
| Copper alloy powder | 60 | | 50 | 60 | | 30 | 50 | 60 | 50 | 65 | 55 | 65 |
| Cuprous oxide | | 50 | | | | | | | | | | |

TABLE 10-continued

| | Blend compositions of Comparative Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Copper powder | | | | | 50 | | | | | | | |
| Zinc oxide | | | | | | | | | 10 | | | |
| Talc *1 | | | | | | | | | | | 10 | |
| Xylene | 20 | 32 | 32 | 20 | 32 | 30 | 32 | 20 | 20 | 15 | 15 | 15 |
| Copper alloy composition | | | | | | | | | | | | |
| Copper | 89% | — | 69% | 89% | — | 94% | 98% | 89% | 89% | 89% | 89% | 89% |
| Nickel | 0 | — | 30 | 10 | — | 0 | 1 | 10 | 0 | 0 | 0 | 0 |
| Manganese | 10 | — | 0 | 0 | — | 5 | 0 | 0 | 10 | 10 | 10 | 10 |
| Iron | 1.0 | — | 1.0 | 1.0 | — | 1.0 | 1.0 | 1.0 | 1.0 | 1.0 | 1.0 | 1.0 |

*1: Commercially available spherical talc, average particle size: about 10 μm

TABLE 11

| | Results of Comparative Tests (Antifouling performance) | | | | | | | | | | | |
|---|---|---|---|---|---|---|---|---|---|---|---|---|
| | 6 months | | 9 months | | 12 months | | 18 months | | 24 months | | 30 months | |
| Comparative Examples | Slime | Shells, algae | Slime | Shells, algae | Slime | Shells, algae | Slime | Shells, algae | Slime | Shells, algae | Slime | Shells, algae |
| 1 | 2 | 0 | 1 | 0 | 1 | 5 | 1 | 10 | 1 | 50 | 1 | 80 |
| 2 | 2 | 5 | 1 | 5 | 1 | 10 | 1 | 30 | 1 | 50 | 1 | 90 |
| 3 | 2 | 0 | 1 | 0 | 1 | 10 | 1 | 30 | 1 | 70 | 1 | 90 |
| 4 | 2 | Coating film swelled and peeled | — | — | — | — | — | — | — | — | — | — |
| 5 | 1 | 0 | 1 | 5 | 1 | 10 | 1 | 30 | 1 | 50 | 1 | 90 |
| 6 | 1 | 5 | 1 | 10 | 1 | 20 | 1 | 30 | 1 | 70 | 1 | 90 |
| 7 | 3 | 0 | 2 | 0 | 2 | 0 | 1 | 10 | 1 | 20 | 1 | 60 |
| 8 | 4 | 0 | 3 | 0 | 3 | 0 | 2 | 0 | 2 | 0 | 1 | 20 |
| 9 | 3 | 0 | 2 | 0 | 2 | 0 | 1 | 5 | 1 | 10 | 1 | 30 |
| 10 | 2 | 0 | 1 | 0 | 1 | 5 | 1 | 10 | 1 | 50 | 1 | 80 |
| 11 | 2 | 0 | 1 | 0 | 1 | 5 | 1 | 15 | 1 | 50 | 1 | 90 |
| 12 | 3 | 0 | 2 | 0 | 2 | 0 | 1 | 10 | 1 | 20 | 1 | 60 |

(The antifouling performance was evaluated in the same manner as in the preceding Examples.)

Further, with respect to the coating compositions of Comparative Examples 10 to 12, the sedimentation stability of the copper alloy powder was tested in the same manner as in Examples 22 to 27. The results are shown in Table 12.

TABLE 12

| | Results of comparative tests (sedimentation stability) | | | | | |
|---|---|---|---|---|---|---|
| | 1 month | | 3 months | | 6 months | |
| | Depth of liquid | Re-dispersibility | Depth of liquid | Re-dispersibility | Depth of liquid | Re-dispersibility |
| Comparative Example 10 | 5 | Δ | 6 | X | 6.5 | X |
| Comparative Example 11 | 4 | Δ | 5 | Δ | 5.5 | X |
| Comparative Example 12 | 5 | Δ | 6 | X | 6.5 | X |

(The evaluation method was the same as indicated in Table 9.)

We claim:
1. An antifouling coating composition comprising:
(a) 100 parts by weight of a vehicle comprising a hydrophobic resin (A), a slightly soluble resin (B) and a hydrophilic resin (C), wherein the hydrophobic resin (A) is selected from the group consisting of a vinyl chloride resin, a vinyl chloride-vinyl isobutyl ether copolymer resin, a vinyl chloride-vinyl acetate copolymer resin, chlorinated rubber, chlorinated polyethylene, chlorinated polypropylene, chlorinated paraffin and an acrylic resin, the slightly soluble resin (B) is rosin, and the hydrophilic resin (C) is a resin selected from the group consisting of polyvinyl alcohol, polyvinyl methyl ether, polyvinyl ethyl ether and methylol modified melamine resin, and wherein the resins (A), (B) and (C) have a weight ratio of A/B=5/1 to 1/5 and a weight ratio of (A+B)/C=9/1 to 3/7 and
(b) from 100 to 950 parts by weight of the solid content of vehicle (a) of a copper alloy powder as an antifouling agent comprising from 3 to 25% by weight of nickel, or manganese or mixtures thereof, from 0.1 to 1.5% by weight of iron and the rest being copper.

2. The antifouling coating composition according to claim 1, which further contains zinc oxide.

3. The antifouling coating composition according to claim 2, wherein zinc oxide is in an amount of from 10 to 200 parts by weight per 100 parts by weight of the vehicle (a).

4. The antifouling coating composition according to claim 1, which further contains germanium oxide.

5. The antifouling coating composition according to claim 4, wherein germanium oxide is in an amount of from 5 to 200 parts by weight per 100 parts by weight of the vehicle (a).

6. The antifouling coating composition according to claim 1, which further contains a flake pigment.

7. The antifouling coating composition according to claim 6, wherein the flake pigment is in an amount of from 20 to 200 parts by weight per 100 parts by weight of the vehicle (a).

8. The antifouling coating composition according to claim 6 or 7, wherein the flake pigment is a pigment having an aspect ratio of at least 10 and a longer diameter of at most 200 μm.

* * * * *